United States Patent [19]

Ukon

[11] Patent Number: 5,097,417
[45] Date of Patent: Mar. 17, 1992

[54] TEXT PROCESSING APPARATUS WITH ADJUSTMENT FOR RIGHT MARGIN FLUSH

[75] Inventor: Tsutomu Ukon, Kuwana, Japan

[73] Assignee: Brother Kogyo Kabushiki Kaisha, Japan

[21] Appl. No.: 322,162

[22] Filed: Mar. 13, 1989

[30] Foreign Application Priority Data

Mar. 25, 1988 [JP] Japan ................................ 63-72797

[51] Int. Cl.$^5$ ............................................ G06F 15/38
[52] U.S. Cl. .................................................... 364/419
[58] Field of Search .................. 400/9, 10, 11, 12, 13; 364/419, 523

[56] References Cited

FOREIGN PATENT DOCUMENTS

0139344 5/1985 European Pat. Off. .
1530444 11/1978 United Kingdom .

Primary Examiner—Dale M. Shaw
Assistant Examiner—Andrew Bodendorf
Attorney, Agent, or Firm—Oliff & Berridge

[57] ABSTRACT

A text processing apparatus has a row of characters formed by adding a predetermined expansion space after each character or notation of an entered textual data constituted by characters, notations and the like. In setting the starting position for printing the row of characters formed at a predetermined position, the starting position of the row of characters is obtained by deleting the expansion space added after the last entered character of the row of characters formed. In this text processing apparatus, the row of charactres formed can be printed in an intended position both when a centering mode is selected, in which the row of character including the added expansion spaces are arranged in the center of a line, and when a right margin flush mode is selected, in which the row of characters are arranged flush to the right margin of a line and printed in this arrangement.

7 Claims, 7 Drawing Sheets

|  | LEFT MARGIN | CENTERING | RIGHT MARGIN |
|---|---|---|---|
| (a) NORMAL MODE | A B | | |
| · CENTERING | | A\|B | |
| · RIGHT MARGIN FLUSH | | | A B |
| [CONVENTIONAL] (b) EXPAND MODE | A⌴ B⌴ | | |
| · CENTERING | | A⌴\|B⌴ | |
| · RIGHT MARGIN FLUSH | | | A⌴B⌴ |
| [PRESENT INVENTION] (c) EXPAND MODE | A⌴ B⌴ | | |
| · CENTERING | | A⌴B | |
| · RIGHT MARGIN FLUSH | | | A⌴B |

TEXT PROCESSING APPARATUS WITH ADJUSTMENT FOR RIGHT MARGIN FLUSH

BACKGROUND OF THE INVENTION

The present invention relates to a text processing apparatus for creating a document from entered textual data, especially a text processing apparatus capable of expanding the character pitch and setting the arrangement of textual data in an intended position of a line.

Generally, such a kind of text processing apparatus has, as a text processing mode, a predetermined pitch mode in which the character pitch is set at a predetermined pitch such as the pica pitch or the elite pitch, and the characters and the like are arranged at the predetermined pitch to create a text. The text processing apparatus has, as another text processing mode, an expand mode in which the character pitch is set at an expanded pitch obtained by expandingly adjusting the above-mentioned predetermined pitch and the characters are arranged at the expanded pitch to create a text. To describe in more detail, the expand mode is a mode in which characters, notations and the like are automatically arranged at a character pitch obtained by increasing the predetermined pitch at predetermined times to create a text, or a space is automatically and continuously added after each character or notation at a predetermined pitch to create a text having characters, notations and the like with expanded spaces therebetween respectively. By executing such an expanded pitch mode, a text intended to emphasized in comparison with a text formed in a predetermined pitch mode, such as a title, can be easily created.

Further, such a kind of text processing apparatus has the following modes for outputting a text created as above-mentioned to be arranged in a predetermined position of a line on a printing medium:

a centering mode (hereinafter referred to as CTR mode): in which a text is outputted proportionally with respect to the middle point between the right and left margins or two ends of a line; and a right margin flush mode (hereinafter referred to as RMF mode): in which a text is outputted to be flushed to the right margin.

Accordingly, by executing each one of a predetermined pitch mode, an expand mode, CTR mode and RMF mode in combination, characters of a title can be proportionally arranged in the center of a line to stand out clearly from other texts, and characters of a text constituting a date or a section name of drafting the document can be flushed to the right margin, so that a preferred document in accordance with a due form can be easily obtained.

Though such a text processing apparatus is valuable for the above uses it is unsatisfactory in certain applications and has the following disadvantage.

When a text created in an expanded pitch mode (hereinafter referred to as expanded text) is outputted in a predetermined position or a printing medium, for example, outputted in CTR mode in the middle position between the right and left margins, or outputted in RMF mode to be flushed to the right margin, the actual outputted text does not appear as intended by the operator.

Figure 6:
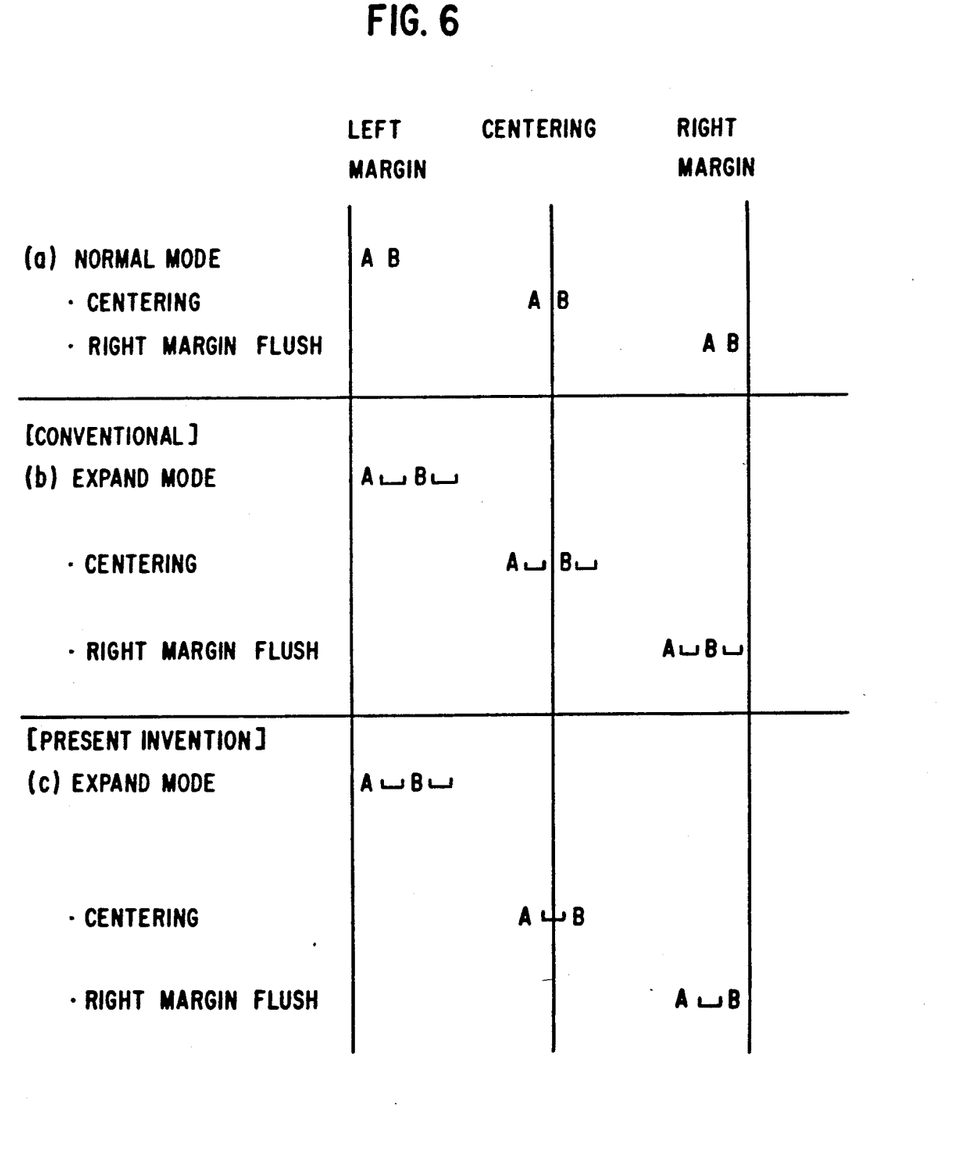

In the concrete, when an expanded text is outputted in CTR mode, the text which includes a space added after the last data of the text is centered as a whole. As a result, the expanded text cannot be uniformly arranged with respect to the middle point between the right and left margins due to the last added space, and, for example, a title is put out of the center of a line. Further, in the case of outputting an expanded text in RMF mode, a space is produced between the right most character of the text and the right margin, and the rightmost characters of lines cannot be justified. This problem is illustrated in FIG. 6, section (b).

Though these modes are provided in order to improve the use value of a text processing apparatus, some combinations of the modes cause the output of a document unintended by the operator.

SUMMARY OF THE INVENTION

The present invention has been made for the purpose of above-mentioned problems, and an object of the present invention is to provide a text processing apparatus in which, even in the case of executing an output mode for outputting a text to be arranged in a predetermined position on a printing medium and an expanded pitch mode in combination, a created text can be outputted to be arranged in the position on the printing medium intended by the operator.

BRIEF DESCRIPTION OF THE DRAWINGS

FIGA. 4(a) and (b) are flow charts showing operations of printing entered characters by the electronic typewriter;

FIGS. 6(a) and (B) and (c) are charts depicting a sample text in (a) a normal mode, (b) a conventional expand mode, and (c) the expand mode according to the present invention.

DETAILED DESCRIPTION OF PREFERRED EMBODIMENTS OF THE INVENTION

Figure 1:
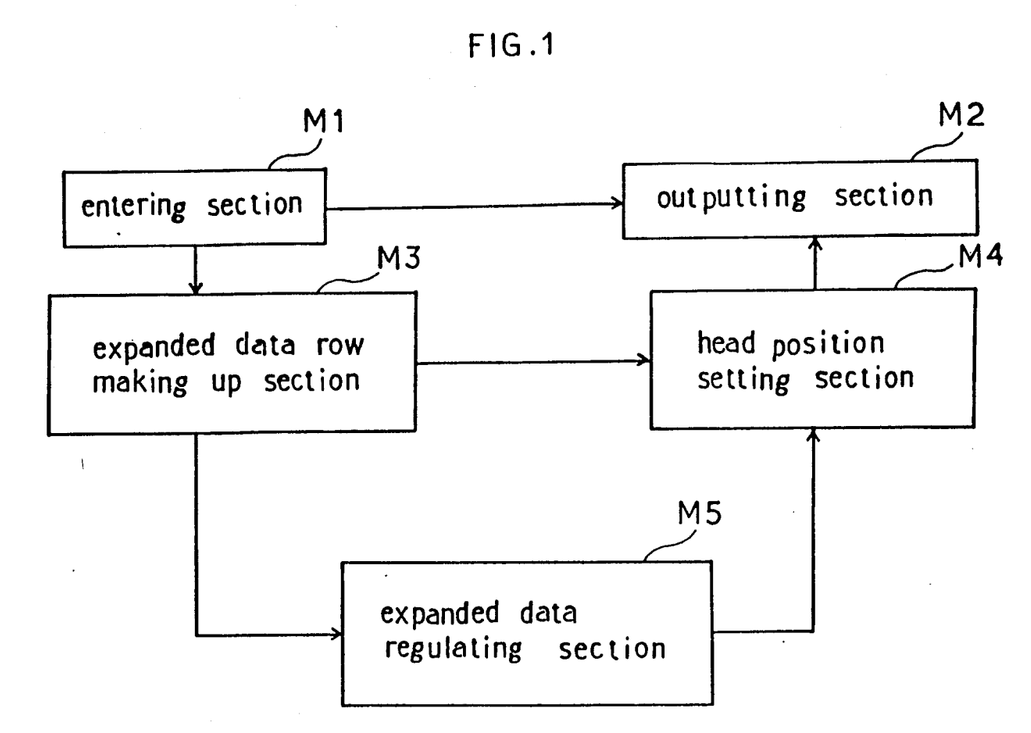
FIG. 1 is a block diagram showing the basic structure, of the present invention.

For the purpose of solving the above-mentioned problems, a text processing apparatus according to the present invention comprises, as shown in the basic structural view of FIG. 1, an entering section M1 for entering data such as characters and notations; an outputting section M2 for outputting the entered data on an output medium; an expanded data string (row) forming section M3 for forming an expanded data row in which a predetermined expansion space is added after each one of the entered data by expandingly adjusting the above-mentioned entered data; a starting position setting section M4 for setting the starting position of outputting the expanded data on the output medium; and an expanded data regulating section M5 for executing, when the starting position setting section M4 sets the starting position of outputting the expanded data row by the outputting section M2, the starting position setting section M4 to set the starting position of outputting a new expanded data row obtained by deleting the predetermined expansion space added after the last entered data in that particular row.

In a text processing apparatus according to the present invention, data entered from the entering section M1, namely, characters, notations and the like corresponding to the entered data are outputted on an output medium by the outputting section M2.

Further, the text processing apparatus according to the present invention has an expanded data forming section M3 for forming an expanded data row in which a predetermined expansion space is added after each one of the entered data by expandingly adjusting the above-mentioned entered data. The starting position for outputting the expanded data row on an output medium is set by the starting position setting section M4.

Further, when the starting position setting section M4 sets the starting position for outputting the expanded data row in a predetermined position, the expanded data regulating section M5 operates to execute the starting position setting section M4 to set the starting position of outputting a new expanded data row obtained by deleting the predetermined space added subsequent to the last entered data in the previous row.

Now, an embodiment of the present invention will be described below with reference to the appended drawings.

Figure 2:
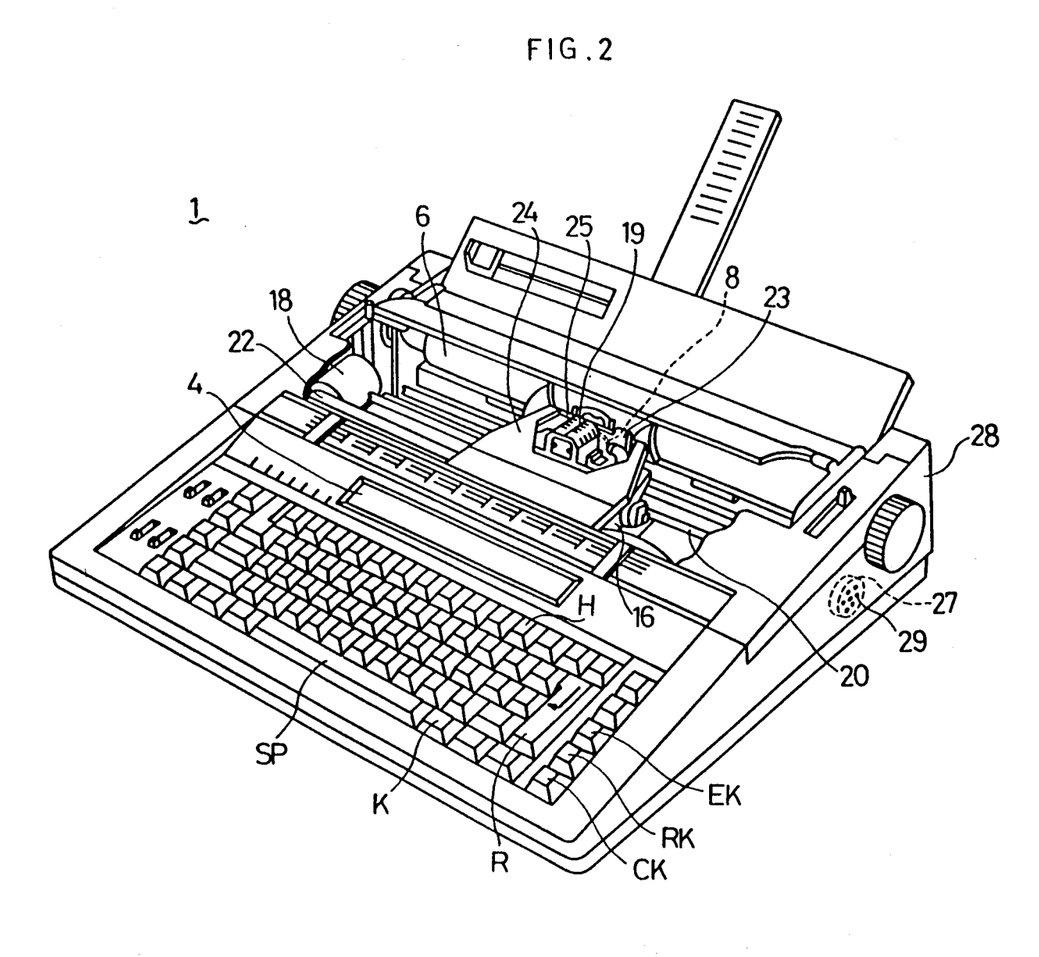
FIG. 2 is a perspective view schematically showing an electronic typewriter as an embodiment of the present invention.
Figure 3:
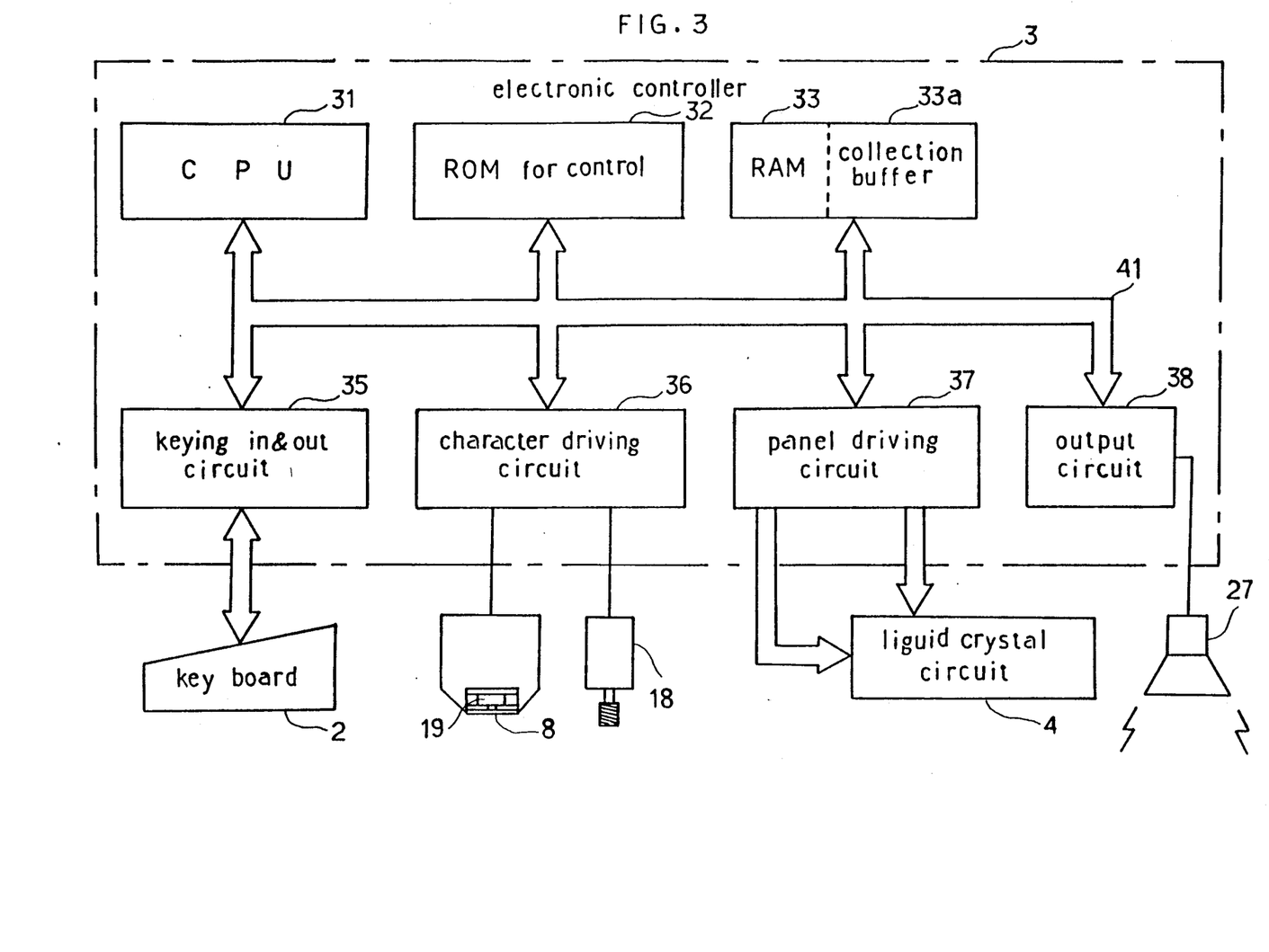
FIG. 3 is a block diagram showing the electric structure of the electronic typewriter of FIG. 2.

In an electronic typewriter 1 shown in FIGS. 2 and 3, queues (rows) of characters such as words entered through a keyboard 2 are introduced into an electronic controller 3 (see FIG. 3) and stored therein and at the same time displayed on a liquid crystal panel 4. The stored rows of characters are printed at the same time as they are entered, or by predetermined keying, on a paper (not shown) mounted on a platen 6 by means of a daisy wheel 8.

While the typewriter 1 is in the above-mentioned printing operation, the electronic controller 3 controls the position of a carriage 16 in the direction of a line by driving a stepping motor 18 and also controls the daisy wheel 8 and a printing hammer 19 mounted on the carriage 16. The carriage 16 is slidably supported by a guide shaft 20 provided in parallel with the platen 6 and is driven in the axial direction of the platen 6 through a toothed belt 22 by the rotation of the stepping motor 18. The daisy wheel 8, rotatably fitted in a character cassette 23, is constructed so that a character (not shown) is placed in the printing position by the rotation of a character-selecting stepping motor (not shown). That character is hit by the printing hammer 19 and printed on the paper through an ink ribbon 25. A new line is started by executing a return key R or the like. The movement of the carriage 16 by one character space is executed by a space key SP, and printed characters are erased by operating a correction key K.

Among keys on the keyboard 2, selection keys for various kinds of operation modes provided in the electronic typewriter 1 and optionally selected by an operator are included. For example, at the rightmost position of the lowermost row of the keys, a centering key CK is provided for selecting CTR mode for printing a row of characters in the middle position between the right and left margins. Above the centering key CK, a right margin flush key RK is provided for selecting RMF mode for printing a row of characters so as to be flushed to the right margin.

Further, above the right margin flush key RK, an expanding key EK is provided for selecting EXP mode for making up a row of data or characters by compulsorily adding the data of a space (hereinafter referred to as expansion space) after each data consisting of a character, notation, space or the like, each time it is entered through the keyboard 2.

On one side of the electronic typewriter 1, a buzzer 27 is fitted, and a plurality of penetrating holes through which a sound generated from the buzzer 27 passes are provided in the corresponding position of a case 28.

As shown in FIG. 3, the electronic controller 3 is constituted by a logic operational circuit comprising a Central Processing Unit (CPU) 31, a Read Only Memory (ROM) 32 for control in which programs and data for control are preliminarily stored, a Random Access Memory (RAM) 33 and the like. The CPU 31 temporarily reads and writes necessary data in the RAM according to a program stored in the ROM 32 for control, and at the same time executes the following input and output operations:

(1) Keying-In on the keyboard 2 through a keyboard input-output circuit 35.

(2) Controlling the feed of the carriage 16 by driving the stepping motor 18 through a character driving circuit 36, and at the same time printing characters on a paper by controlling the character selecting stepping motor and the printing hammer 19.

(3) Displaying character data and necessary data entered through the keyboard 2 on the liquid crystal panel 4 by means of a panel driving circuit 37.

(4) On receiving a command of starting a new line, returning the carriage 16 to the home position (left margin) by driving the stepping motor 18, and at the same time feeding the paper by one line space by driving a line feed motor (not shown) to rotate the platen 6, and other operations.

The CPU 31 exchanges necessary data and the like through a bus 41 with the ROM 32 for control, the RAM 33, the keyboard input-output circuit 35, the character driving circuit 36, the panel driving circuit 37, an output circuit 38 and thereby executes control to carry out the above-mentioned operation according to the beforementioned operation modes selected by the operator.

Now, a printing control routine for printing entered words or the like on a paper will be described as follows with reference to the flow chart of FIG. 4. In the operation of this electronic typewriter 1 by an operator, first the RMF mode or the like is set if needed, next the next processing operation by means of character and notation keys is executed, and then printing is carried out according to a print command through the return key R or the like. Accordingly, the following description will be given in this order of operations.

Figure 4A:
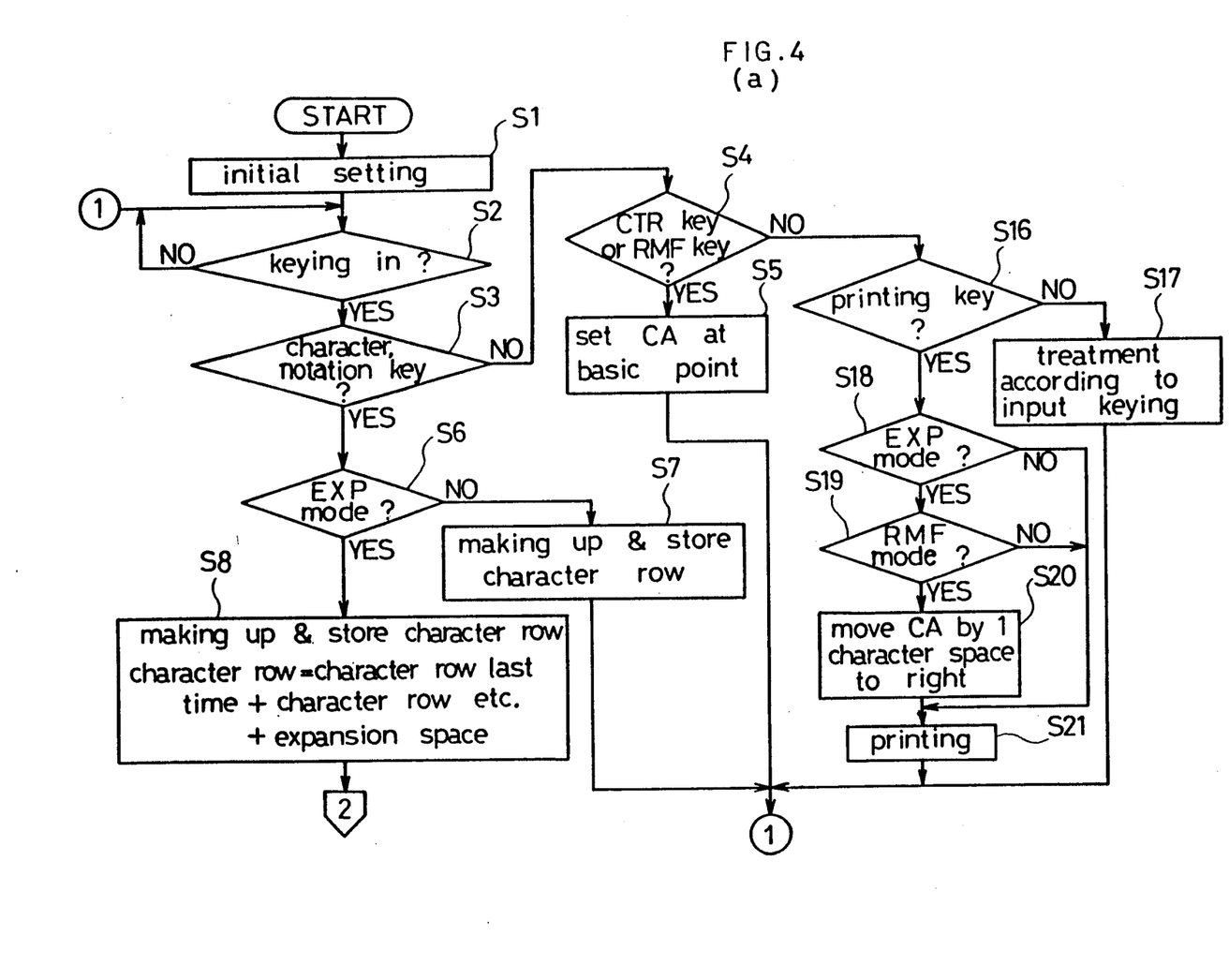

First, when a power source for the electric typewriter 1 is switched on, the initial setting operation is executed, such as clearing a collection buffer 33a which is provided in the RAM 33 and in which data of rows of characters based on entered characters and the like are to be temporarily stored (step 1, hereinafter referred to simply as S1, and the same applied correspondingly to the following steps). Next, it is judged whether keying-in has been executed (S2), and when it has not been executed, the program returns to S2 and keying-in is awaited. When keying is executed, it is judged whether the key used for the keying-in is a character or notation key (S3). When the key is judged not to be a character or notation key at S3, then it is judged whether the key is the centering key CK or the right margin flush key RK or not (S4). When the key is the centering key CK or the right margin flush key RK, the carriage 16 is set in a home position by driving the stepping motor 18

(S5). The home position is the middle point between the right and left margins when the operation is in CTR mode executed by pressing the centering key CK, and it is the right margin when the operation is in RMF mode executed by pressing the right margin flush key RK. At S5, when the carriage 16 is set in the home position, the program returns to S2 and keying-in through a character or notation key is awaited. In other words, the electronic typewriter 1 is now in CTR mode or RMF mode.

When the key used for the keying-in is determined to be a character or notation key at S3, then it is judged whether EXP mode obtained through the expand key EK is set (S6). When EXP mode is not set, a row of continued characters and/or notations constituted by successively keyed-in characters and/or notations is formed and stored in the predetermined address in the collection buffer 33a (S7). In other words, each time a character or notation is keyed in, a row of characters and/or notations including that keyed-in character or notation is formed and stored, and the program from S2 is repeated and the print command is delayed until the print command is keyed in.

On the other hand, when it is determined that EXP mode is set at S6, a row of characters is formed in the following manner and stored in the collection buffer 33a (S8).

In other words, a row of characters is formed by continuously adding a keyed-in character or the like and an expansion space, in this order, until the last expansion space of a row of characters is formed. Each time a character or the like is keyed in, the row of characters thus formed is stored in the collection buffer 33a (S8). Then, (referring to FIG. 4(b)), the character number PS required for printing that row of characters is set as a number obtained by subtracting 1 (corresponding to the last expansion space in the row) from the number of the characters and/or notations and the like of the row of characters formed at S8 (S9).

Figure 4B:
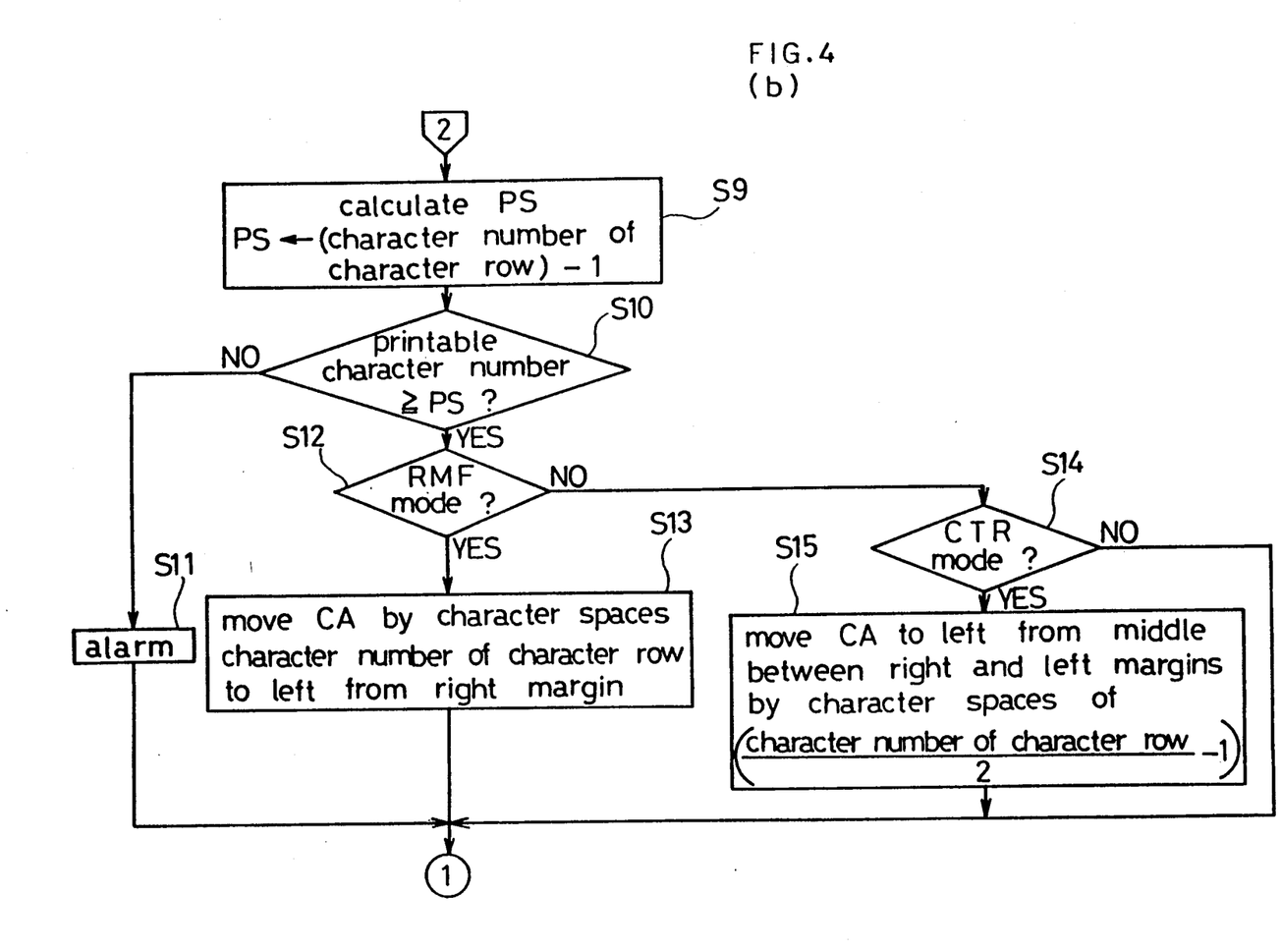

Then, by comparing the number of characters printable in an intended line with the above-mentioned character number PS, it is judged whether the obtained row of characters are printable (S10). When the number of characters printable in the intended line is smaller than PS and the row of characters are not printable, a warning is given to the operator by the buzzer 27, any indication on the liquid crystal panel 4 or the like (S11). Thereafter, the program returns to S2 and the new keying-in is awaited.

On the other hand, when it is determined that the row of characters are printable at S10, it is judged whether RMF mode has been set based on the judgment of whether the key is the centering key CK or the right margin flush key RK executed at S4 (S12). When it is determined that RMF mode is set, the carriage 16 set at the right margin (home position) at S5 is moved, by driving the stepping motor 18, to the left from the right margin by the number of character spaces corresponding to the number of the characters and/or spaces of the row of characters made up at S8 (S13). Then, the program from S2 is repeated and keying-in of a print command is awaited. For example, as seen in FIG. 6, when the character "A" is keyed in at S3, a row of characters "A" is made up by adding an expansion space to "A", and stored in the collection buffer 33a (S8).

Since the character number of the row of characters "A" is 2, the carriage 16 is moved to the left from the right margin by 2 character spaces (S13).

When the character "B" is keyed in after the character "A" is keyed in (S3), a row of characters "A B " is formed by adding the character "B" and 1 expansion space subsequent thereto to the row of characters "A", and is stored (S8). Since the character number of the row of characters "AB" is 4, the carriage 16 is moved to the left from the right margin by 4 character spaces. The operation of S13 is always executed when RMF mode is set, regardless of EXP mode being set or not in this embodiment.

Now, in this embodiment, the position set up for a right margin is out of the printing area, and the printing area is from a position next to the left margin to a position of the front of one character space next to the right margin. And then, as a result of executing S13, in EXP mode and also RMF mode, the carriage 16 is not positioned at a starting position of printing, but it can be compensated at S20 hereinafter mentioned. Except the EXP mode, the carriage 16 is always positioned at a starting point of printing in this embodiment. The above-mentioned program is repeated until a print command is keyed in. Each time a character or notation is keyed in, the abovementioned row of characters is formed according to EXP mode and stored, and the carriage 16 is moved.

On the other hand, when it is determined that RMF mode is not set at S12, then it is judged whether CTR mode is set (S14). When CTR mode is not set, the program returns to S2 and the print command is awaited. When it is judged that CTR mode is set at S14, the carriage 16 set in the middle position (home position) between the right and left margins is moved, by driving the stepping motor 18, at each keying-in operation to the left from the middle position by the number of character spaces corresponding to the number obtained by subtracting 1 from half the number of characters and/or spaces of the row of characters made up at S8 (S15). Then, the program from S2 is repeated and the PRINT command is awaited. For example, when the character "A" is keyed in before the print command is executed, a row of characters "A" is formed (S8), and the carriage 16 is moved to the left from the middle position between the right and left margins by (2/2−1=0) character space (S15). In other words, in the case of the first keying-in of a character or notation the carriage 16 is not moved. When the character "B" is subsequently keyed-in, a row of characters "A B " is formed (S8), and the carriage 16 is moved to the left from the middle position between the right and left margins by (4/2−1=1) character space (S15). Consequently, the carriage 16 is always positioned at a starting position of printing in CTR mode of this embodiment. The operation of S15 is that of CTR mode only in the case of EXP mode being set, and another operation is executed when EXP mode is not set. In other words, when EXP mode is not set, in place of executing S15, the carriage 16 is moved at each keying-in operation to the left from the middle position by the number of character spaces corresponding to a half number obtained by subtracting 1 from the number of the characters.

In the above-mentioned manner, rows of characters are formed and stored according to executed RMF mode, CTR mode or EXP mode, each time a character or notation is keyed in (S5 to S15).

Now, the way of printing a row of characters formed in the above-mentioned steps will be described below. When it is determined that the key used for keying-in is not a character or notation key at S3 and further, when it is determined that the key is not the centering key CK or the right margin flush key RK at S4, it is judged whether the key is a print command key such as return key R or the like (S16). When it is determined that the key is not a print command key at S16, an operation according to the keying-in, such as setting EXP mode by operating the EXPAND key EK, is executed (S17), the program returns to S2, and keying-in is awaited.

On the other hand, when it is determined that the key is a print command key at S16, it is judged whether EXP mode is set (S18). When it is determined that EXP mode is not set, the program advances to S12. When it is determined that EXP mode is set at S18, then it is judged whether RMF mode is set or not (S19). When it is determined that RMF mode is not set, that is, when the operation is in CTR mode where an expansion space has been added to the end of the row of characters at S15 or the operation is in other modes where such an expansion space is not required to be added to the end of the row of characters, the program advances to S21. When it is determined that RMF mode is set, the carriage 16, which has been moved to the left from the right margin by the number of character spaces corresponding to the character number of the row of characters at S13, is moved to the right by one character space (S20). In other words, the carriage 16 is moved to the right by the expansion space at the end of the above-mentioned row of characters. Then, the row of characters made up at S7 or S8 are printed on a paper (not shown), with the carriage 16 being moved to the right by one character space each time one character is printed (S21). When the printing operation is completed, the program returns to S2, setting of CTR mode and the like, forming, storing and printing of a row of characters are repeated as above-mentioned. After the printing operation is completed, the rows of characters stored in the collection buffer 33a are deleted.

Figure 5A:
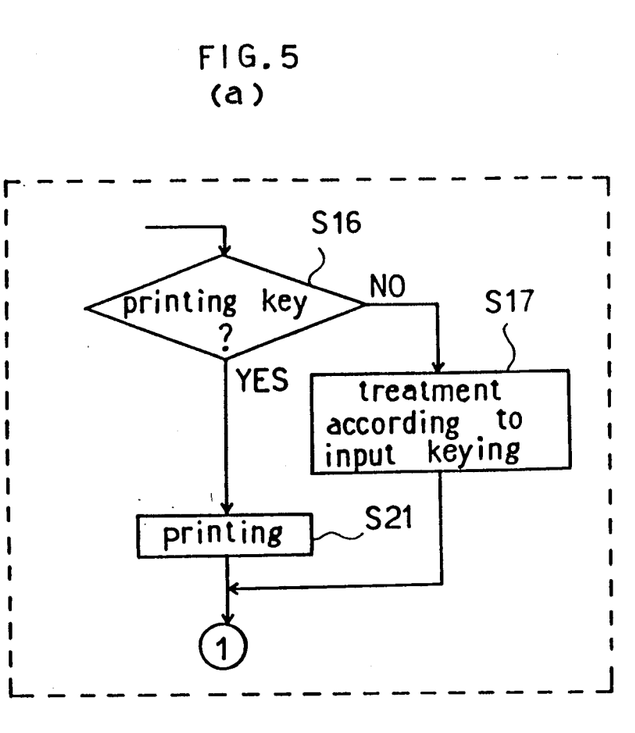
FIG. 5(a) and (b) are a part of flow charts showing another embodiment corresponding to FIG. 4(a) and (b)
Figure 5B:
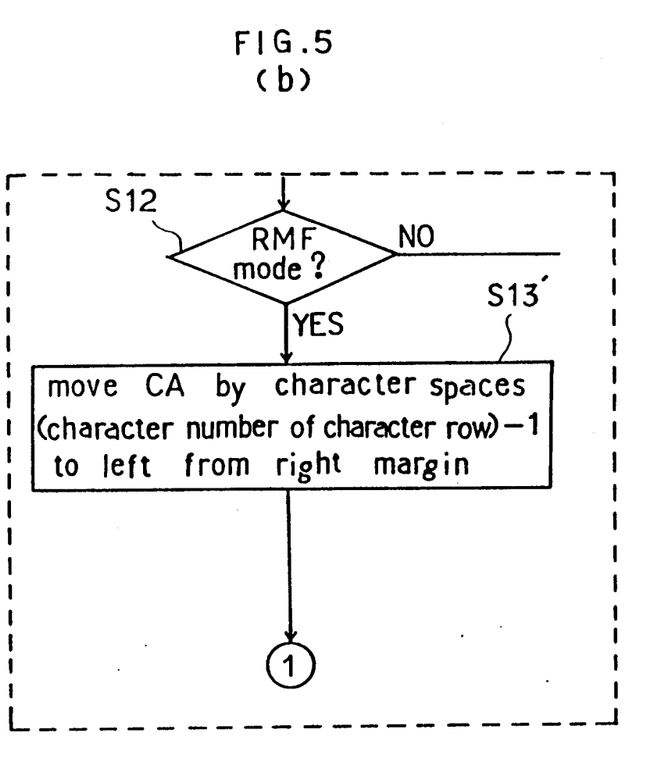

As for another embodiment, it is possible to change the step S13 of the flow chart in FIG. 4(b) to a step S13' as shown in FIG. 5(b), and, in connection with this, a flow chart as shown in FIG. 5(a) is applied replacing the flow chart in FIG. 4(a).

Specifically, at step S13' in EXP and RMF mode, the carriage 16 is moved to the left from the right margin by the number of character spaces obtained by subtracting 1 from the number of the characters of the row of characters. By executing step S13', the carriage 16 is positioned at a starting point of printing. Consequently, in this embodiment, Steps S18, S19, S29 of flow chart in FIG. 4(a) can be omitted as shown in FIG. 5(a) in a printing operation.

In typewriter 1 having the above-mentioned construction according to the present invention, a row of characters (textual data) formed in EXP mode in which an expansion space is automatically added subsequent to an entered character are printed in CTR mode or RMF mode as described in the following.

In other words, the starting position of printing the row of characters formed in EXP mode is decided from the row of characters obtained by deleting the last expansion space from the above-mentioned row of characters in EXP mode, and the printing operation is started from the decided starting position. As a result, the abovementioned row of characters (textual data) can be always printed exactly in the position intended by the operator. In other words, in the case of CTR, the row of characters can be printed in such a manner that they are arranged uniformly with respect to the middle point between the right and left margins. In the case of RMF mode, the row of characters can be printed in such a manner that they are flushed to the right with the last keyed-in character at the right margin. Consequently, in executing CTR mode or RMF, a row of characters can always be in the desired position, regardless of EXP mode being selected or not.

Further, when a row of characters formed in EXP mode are printed in CTR mode or RMF mode, and the row of characters cannot be printed within an intended line, a warning is given to the operator as above-mentioned. This is advantageous in the following respect.

For example, when a character is keyed in and then printed and this operation is repeated part way in a line, and thereafter textual data made up in EXP mode are printed in RMF mode in the remaining part of the line, the number of characters capable of being keyed in is different from the number of printable characters. However, it is not necessary to consider the above-mentioned two numbers of characters in keying in the characters in the electronic typewriter 1 of the above-mentioned embodiment of the present invention.

The present invention is not limited to the above-mentioned embodiment. For example, it is needless to say that the present invention can be applied to a text processing apparatus having a second EXP mode in which the pitch of characters is expanded at predetermined times, in addition to the EXP mode of the above-mentioned embodiment in which an expansion space is compulsorily added subsequent to each keyed-in character. In the second EXP mode, the starting position of printing is decided based on the length of a row of characters, the last expansion space of which has been deleted.

Further, though the application of CTR mode and RMF mode is described in the above-mentioned embodiment, a row of characters can be printed in the intended position in all the modes in which the starting position of printing changes with the presence or absence of the last expansion space of the row of characters, such as between tab centering mode and proportional spacing mode in which a plurality of characters are proportionally arranged between two points.

Further, though the carriage is moved each time keying-in is executed (S13, S15) in the above-mentioned embodiment, the carriage can be moved after the starting position for printing of the row of characters is decided.

Furthermore, a row of characters obtained by deleting the last space from a row of characters stored in EXP mode in the collection buffer 33a can also be printed in an intended position. It is natural that while forming a row of characters, they can be displayed on the liquid crystal panel.

While the embodiments of the present invention, as herein disclosed, constitute a preferred form, it is to be understood that other forms may be adopted.

What is claimed is:

1. A text processing apparatus for receiving data and outputting the data on an output medium in rows having right and left margins comprising:
   an entering means for entering data such as characters and notations,
   an outputting means for outputting the entered data on an output medium,
   an expanded data string forming means for forming an expanded data string by expanding the entered data so that an expansion space is added after each one of the entered data, a starting position setting means for setting a starting position of outputting the expanded data string on the output medium, and an expanded data regulating means for executing, when the starting position setting means sets the starting position of outputting the expanded data string by the outputting means, the starting position setting means to set the starting position of outputting a new expanded data string obtained by deleting the expansion space added after the last entered data in a row.

2. A text processing apparatus as claimed in claim 1, wherein the starting position setting means has a key for selecting a centering mode in which a queue of characters of entered data are printed in a middle position between the right and left margins.

3. A text processing apparatus as claimed in claim 1, wherein the starting position setting means has a key for selecting a right margin flush mode in which a queue of characters of entered data are arranged flush to the right margin and printed in this arrangement.

4. A text processing apparatus as claimed in claim 1, wherein a key is provided for selecting a mode in which the expanded data string forming means is operated.

5. A text processing apparatus as claimed in claim 1, wherein the outputting means has a cartridge on which a printing member is mounted, and the expanded data regulating means operates to move the carriage, which has been moved to the left from the right margin by a number of character spaces corresponding to the number of characters in a queue of characters of the entered data, to the right by a space corresponding to an expansion space at the end of the queue of characters, when a right margin flush mode is set.

6. A text processing apparatus as claimed in claim 1, wherein the expanded data forming means has a key for expanding a character pitch at predetermined times.

7. A text processing apparatus as claimed in claim 1, further comprising:

a means for calculating a printing character number required for printing a queue of characters formed from the entered data, by subtracting a character number corresponding to the last expansion space of a row of characters formed from the number of characters in the queue of characters, a means for judging whether the queue of characters is printable or not by comparing the calculated printing character number with a number of characters printable within a row, and a means for giving a warning to an operator when the printable character number is smaller than the calculated printing character number and therefore the queue of characters are not printable.

* * * * *